(12) United States Patent
Watanabe

(10) Patent No.: US 11,738,541 B2
(45) Date of Patent: Aug. 29, 2023

(54) DECORATING SHEET AND ELECTROSTATIC INPUT DEVICE

(71) Applicant: ALPS ALPINE CO., LTD., Tokyo (JP)

(72) Inventor: Masahito Watanabe, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 136 days.

(21) Appl. No.: 17/645,136

(22) Filed: Dec. 20, 2021

(65) Prior Publication Data

US 2022/0111621 A1 Apr. 14, 2022

Related U.S. Application Data

(63) Continuation of application No. PCT/JP2020/011613, filed on Mar. 17, 2020.

(30) Foreign Application Priority Data

Jul. 1, 2019 (JP) .................................. 2019-123192

(51) Int. Cl.
  *B32B 27/06* (2006.01)
  *B32B 7/12* (2006.01)
  (Continued)

(52) U.S. Cl.
  CPC ................ *B32B 27/06* (2013.01); *B32B 7/12* (2013.01); *B32B 27/308* (2013.01); *B32B 27/36* (2013.01);
  (Continued)

(58) Field of Classification Search
  CPC ...... G06F 3/044; G06F 3/016; G06F 3/03547; G06F 2203/04809; G06F 2203/04103;
  (Continued)

(56) References Cited

U.S. PATENT DOCUMENTS 5,270,097 A * 12/1993 Amemiya ................ B41M 3/06
  428/167
5,296,340 A * 3/1994 Tsukada .................. B32B 38/06
  430/394

(Continued)

FOREIGN PATENT DOCUMENTS

CN 208630122 U 3/2019
JP 2001-347539 12/2001
(Continued)

OTHER PUBLICATIONS

International Search Report for PCT/JP2020/011613 dated Jun. 9, 2020.

*Primary Examiner* — Doon Y Chow
(74) *Attorney, Agent, or Firm* — IPUSA, PLLC

(57) ABSTRACT

A decorating sheet to be attached to a surface of a decoration-target component includes a base film layer including a sheet-like base film; a decorating layer containing a decorating pattern; a light shielding layer provided in a back-side direction with respect to the decorating layer, the light shielding layer including a light transmitting section that has a predetermined shape; and a reflection suppressing layer (Continued)

provided between the decorating layer and the light shielding layer, the reflection suppressing layer containing a reflection suppressing image that is configured to suppress reflection of the decorating pattern onto a light image that is formed by light transmitted through the light transmitting section.

8 Claims, 6 Drawing Sheets

(51) Int. Cl.
*B32B 27/30* (2006.01)
*B32B 27/36* (2006.01)
*B32B 27/40* (2006.01)
*G06F 3/044* (2006.01)

(52) U.S. Cl.
CPC .............. *B32B 27/40* (2013.01); *G06F 3/044* (2013.01); *B32B 2255/10* (2013.01); *B32B 2307/412* (2013.01); *B32B 2451/00* (2013.01); *B32B 2605/003* (2013.01)

(58) Field of Classification Search
CPC ....... B32B 27/308; B32B 27/40; B32B 27/36; B32B 27/06; B32B 7/12; B32B 2307/412; B32B 2605/003; B32B 2255/10; B32B 2451/00; G09F 13/04

See application file for complete search history.

(56) References Cited

U.S. PATENT DOCUMENTS

| | | | |
|---|---|---|---|
| 5,830,529 A | 11/1998 | Ross | |
| 7,175,293 B2* | 2/2007 | Egashira | F21S 43/255 362/351 |
| 10,183,463 B2* | 1/2019 | Lath | E04F 13/0871 |
| 2013/0063050 A1 | 3/2013 | Morikawa et al. | |
| 2017/0355223 A1* | 12/2017 | Shibahara | B32B 7/06 |
| 2019/0310546 A1* | 10/2019 | Lim | G03F 7/0002 |
| 2019/0390839 A1 | 12/2019 | Sugiyama et al. | |

FOREIGN PATENT DOCUMENTS

| | | |
|---|---|---|
| JP | 2003-043575 | 2/2003 |
| JP | 2005-319585 | 11/2005 |
| JP | 2013-077539 | 4/2013 |
| JP | 2014-231311 | 12/2014 |
| JP | 2018-189769 | 11/2018 |
| JP | 2019-136948 | 8/2019 |
| JP | 2020-003569 | 1/2020 |

* cited by examiner

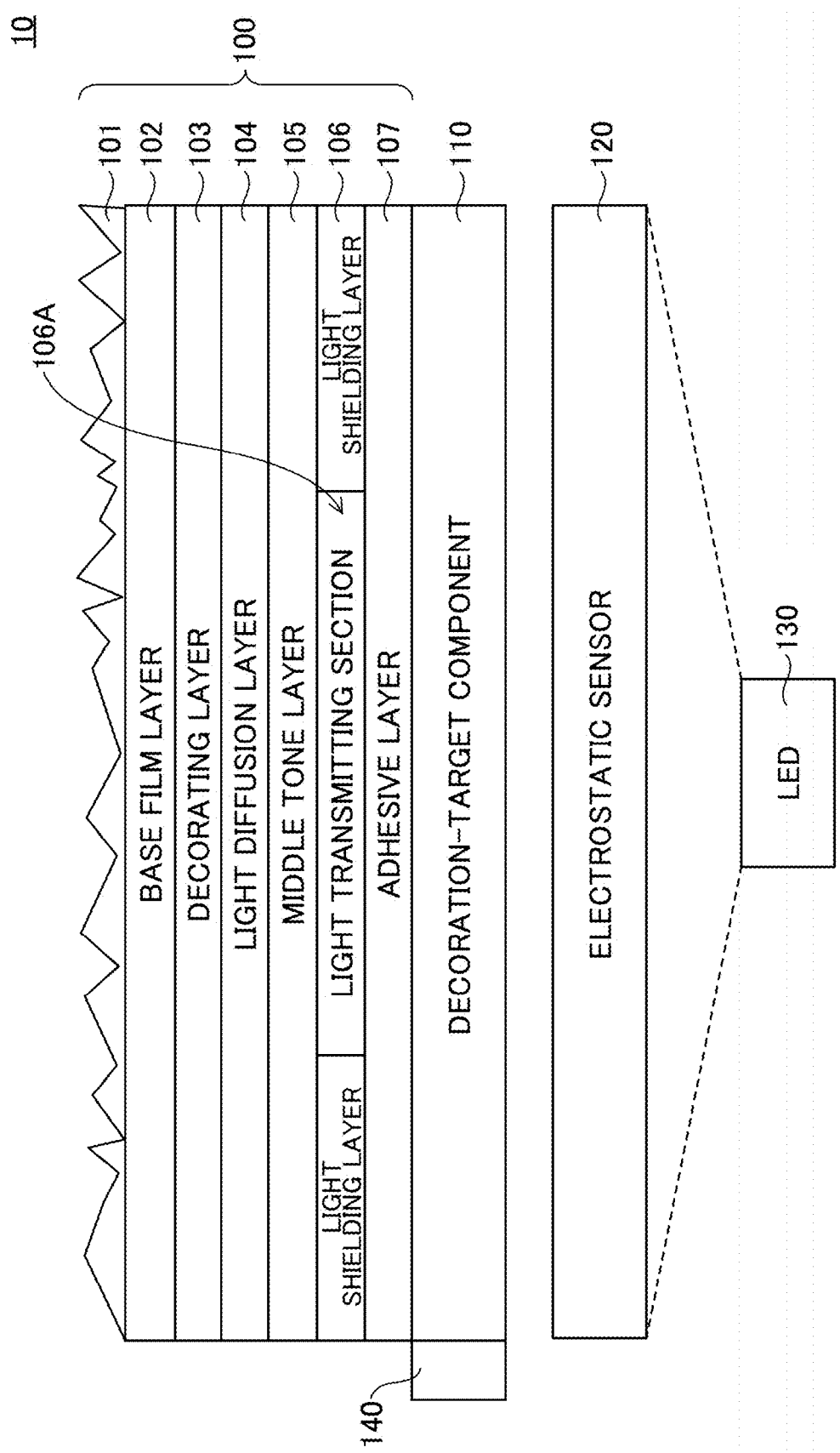

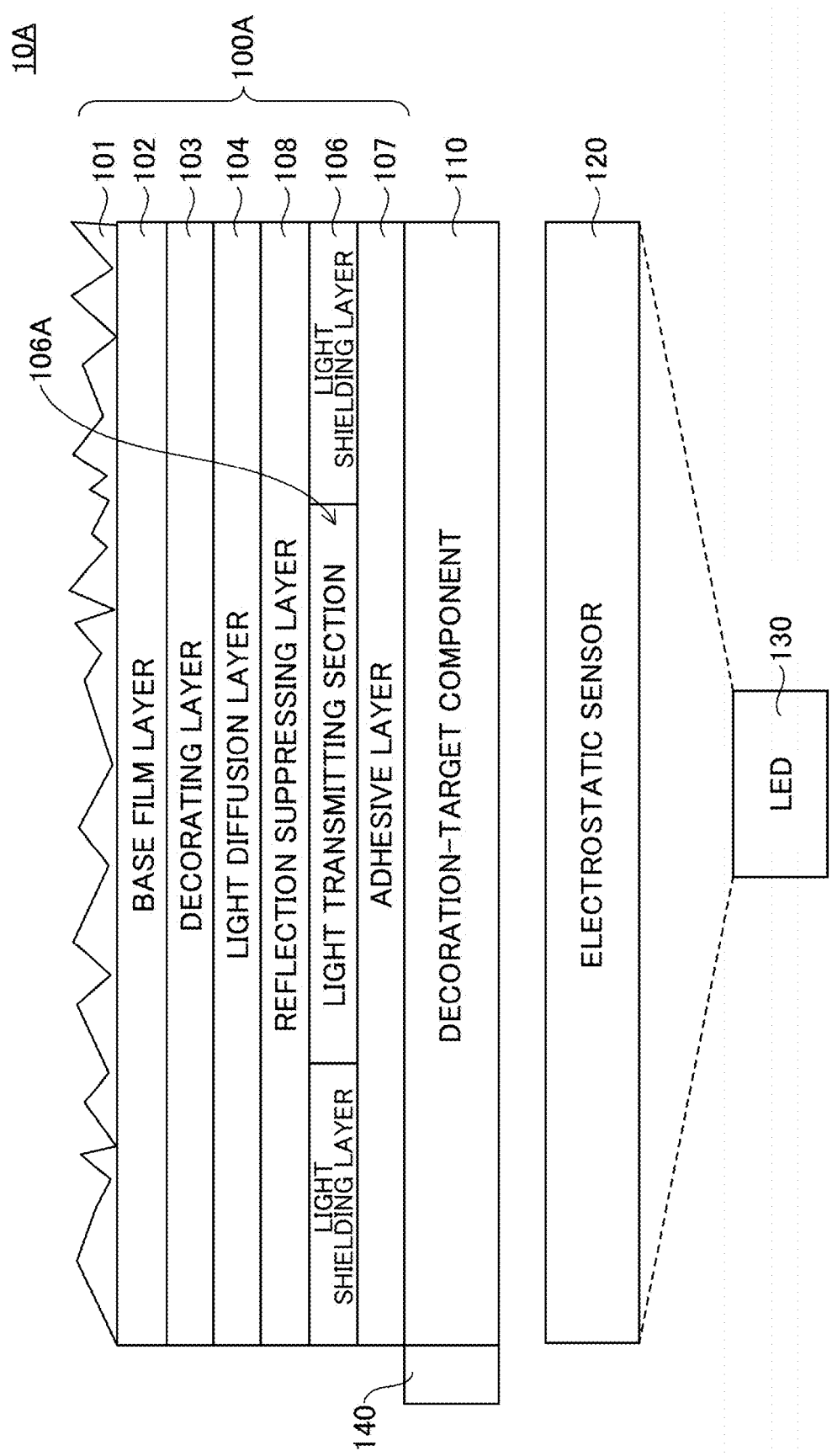

DECORATING SHEET AND ELECTROSTATIC INPUT DEVICE

CROSS-REFERENCE TO RELATED APPLICATION

The present application is a continuation filed under 35 U.S.C. 111 (a) claiming the benefit under 35 U.S.C. 120 and 365 (c) of PCT International Application No. PCT/JP2020/011613 filed on Mar. 17, 2020, and designating the U.S., which is based on and claims priority to Japanese Patent Application No. 2019-123192, filed on Jul. 1, 2019. The entire contents of the foregoing applications are incorporated herein by reference.

BACKGROUND OF THE INVENTION

1. Field of the Invention

The present invention relates to a decorating sheet and an electrostatic input device.

2. Description of the Related Art

There is a technique in the related art of forming a three-dimensional coating (three dimension overlay method (TOM)) on a surface of a decoration-target component having a three-dimensional shape such as one of various components (e.g., an inner panel, and so forth) for a vehicle, to attach a decorating sheet to decorate the surface of the decoration-target component with one of a variety of decorating patterns (e.g., a metal pattern, a woodgrain pattern, and so forth) while protecting the surface of the decoration-target component.

With respect to such a decorating sheet, Patent Document 1 discloses a technique in which light emitted from a light source provided on a back side of the decorating sheet is transmitted through a light transmitting section having a predetermined shape formed in a light shielding layer so that a light image having a predetermined shape can be displayed on a surface of the decorating sheet.

CITATION LIST

[Patent Document 1] Japanese Patent Application Publication No. 2001-347539

SUMMARY OF THE INVENTION

Technical Problem

However, the decorating sheet in the related art having the described configuration is likely to affect the aesthetic design of the decoration-target component because, when displaying a light image, the decorating pattern formed at a position overlapping the light image is seen from a front side of the decorating sheet.

Solution to Problem

A decorating sheet of an embodiment to be attached to a surface of a decoration-target component includes a base film layer includes a sheet-like base film; a decorating layer containing a decorating pattern; a light shielding layer provided in a back-side direction with respect to the decorating layer, the light shielding layer including a light transmitting section that has a predetermined shape; and a reflection suppressing layer provided between the decorating layer and the light shielding layer, the reflection suppressing layer containing a reflection suppressing image that is configured to suppress reflection of the decorating pattern onto a light image that is famed by light transmitted through the light transmitting section.

Advantageous Effects of the Invention

According to the embodiment, the decorating sheet can be provided which, when displaying a light image, can obscure the visibility of a decorating pattern formed at a position overlapping the light image from a front side.

BRIEF DESCRIPTION OF THE DRAWINGS

Other objects, features and advantages of the present invention will become more apparent from the following detailed description when read in conjunction with the accompanying drawings:

FIG. 2 is a diagram schematically depicting a structure of the electrostatic input device according to the first embodiment.

FIG. 4 is a diagram schematically depicting a structure of an electrostatic input device according to a second embodiment.

DETAILED DESCRIPTION OF THE PREFERRED EMBODIMENTS

Hereinafter, embodiments will be described with reference to the drawings.

First Embodiment (Overview of Electrostatic Input Device 10)

Figure 1A:
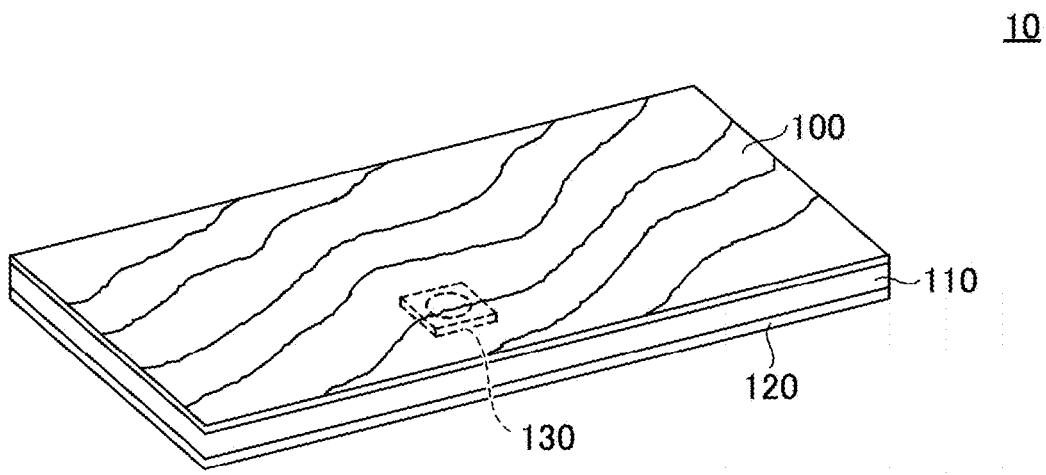
FIGS. 1A and 1B are perspective outline views of an electrostatic input device according to a first embodiment.
Figure 1B:
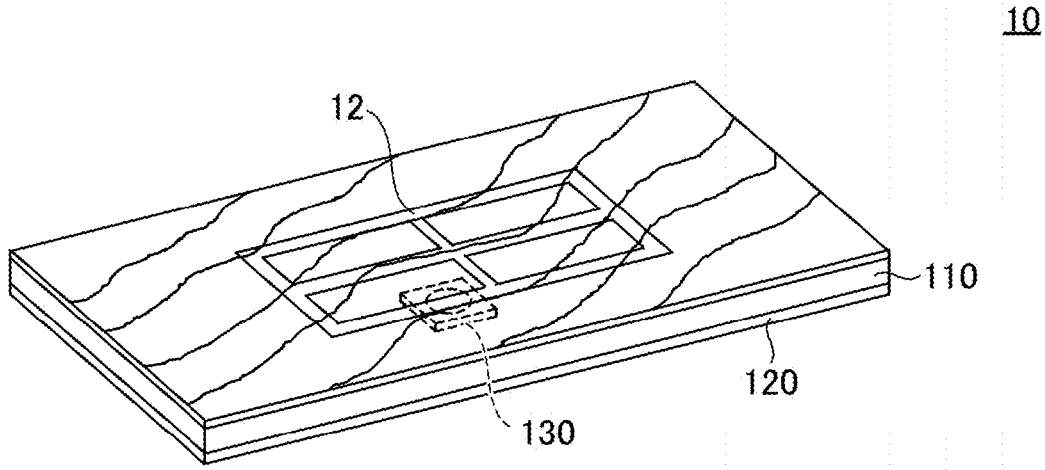

FIGS. 1A and 1B are perspective outline views of an electrostatic input device 10 according to a first embodiment. FIG. 1A depicts a state in which a light image 12 is not displayed on a front-side surface of the electrostatic input device 10. FIG. 1B depicts a state in which a light image 12 is displayed on the front-side surface of the electrostatic input device 10.

As depicted in FIGS. 1A and 1B, the electrostatic input device 10 includes a decorating sheet 100, a decoration-target component 110, an electrostatic sensor 120, a LED 130, and a piezoelectric vibrating element 140.

The decorating sheet 100 is a sheet-like member with a decorating pattern (e.g., a woodgrain pattern, a metal pattern, or the like) formed on a front-side surface. The decorating sheet 100 decorates a surface of a decoration-target component 110 (e.g., an interior panel of a car, or the like) by being attached to the surface of the decoration-target component 110.

The electrostatic sensor 120 is provided on a back side of the decoration-target component 110. The electrostatic sensor 120 can detect a contact position of an operating body (e.g., an operator's finger) with respect to the surface of the decoration-target component 110. Thus, the electrostatic sensor 120 can receive an operation input in accordance with the contact position of the operating body.

The LED 130 is an example of a "light source" provided on a back side of the electrostatic sensor 120. The LED 130 emits light to the decoration-target component 110 at a predetermined timing. The light emission timing of the LED 130 is externally controlled. Light emitted from the LED 130 is transmitted through the electrostatic sensor 120 and the decoration-target component 110. Then, in the decorating sheet 100, the light is also transmitted through a light transmitting section 106A (see FIG. 2) having a predetermined shape. Thus, the LED 130 can display a light image 12 of a predetermined shape on the surface of the decoration-target component 110, as depicted in FIG. 1B. When the LED 130 does not emit light, as depicted in FIG. 1A, a light image 12 is not displayed on the surface of the decoration-target component 110 and only the decorating pattern can be seen.

The piezoelectric vibrating element 140 is an example of a "vibration generator" and is attached to the decoration-target component 110. The piezoelectric vibrating element 140 can provide tactile feedback to the operator by vibrating the decoration-target component 110 in response to a detection signal provided from the electrostatic sensor 120. As the "vibration generator", also a voice coil motor, an eccentric motor, or the like may be used instead of the piezoelectric vibrating element 140.

(Configuration of Decorating Sheet 100)

FIG. 2 is a diagram schematically depicting a structure of the electrostatic input device 10 according to the first embodiment. As depicted in FIG. 2, the decorating sheet 100 includes, from a front side (upper side in the figure), a tactile layer 101, a base film layer 102, a decorating layer 103, a light diffusion layer 104, a middle tone layer 105, a light shielding layer 106, and an adhesive layer 107.

The tactile layer 101 is formed at the front-side direction end (at the upper end in the figure) of the decorating sheet 100. In the example depicted in FIG. 2, the tactile layer 101 is formed on a front (upper) side of the base film layer 102. For example, the tactile layer 101 is formed in an uneven shape by applying a plurality of layers of transparent color ink on top of each other through thermal transfer printing using a thermal transfer printer. Thus, the tactile layer 101 provides a tactile sensation to an operating body (e.g., a human hand, a finger, or the like) that contacts the front-side surface of the decorating sheet 100. The tactile layer 101 may be formed in the uneven shape corresponding to the decorating pattern formed in the decorating layer 103, thereby providing a tactile sensation more similar to that of a material (e.g., wood, metal, or the like) that is simulated by the decorating pattern.

The base film layer 102 is a layer formed of a base film serving as a base of the decorating sheet 100. That is, the decorating sheet 100 is formed by laminating the other layers on the base film layer 102. For example, the base film layer 102 may be formed using a flexible transparent sheet of a resin material (e.g., poly methyl methacrylate (PMMA), urethane, polyethylene terephthalate (PET), or the like). In the present embodiment, the base film layer 102, which is transparent and has a smooth surface, is superposed on a front side of the decorating layer 103. Therefore, in the present embodiment, the base film layer 102 functions also as a protective layer to protect the front-side surface of the decorating layer 103.

The decorating layer 103 contains the decorating pattern (e.g., a woodgrain pattern, a metal pattern, or the like) provided by the decorating sheet 100. In the example depicted in FIG. 2, the decorating layer 103 is formed on a back side (a lower side in the figure) of the base film layer 102. For example, the decorating layer 103 may be formed by applying inks of a plurality of colors (e.g., CMYK) through printing on a per pixel basis on the back side of the base film layer 102 by thermal transfer printing using a thermal transfer printer, in accordance with the pattern to be expressed by the decorating sheet 100. In the present embodiment, non-electrically conductive inks are used to form the decorating layer 103.

The light diffusion layer 104 is provided on a back side of the decorating layer 103. The light diffusion layer 104 diffuses light emitted from the LED 130 so that a light image 12 is uniformly luminous. For example, the light diffusion layer 104 is formed by uniformly applying a white ink through printing on the back side of the decorating layer 103 by thermal transfer printing using a thermal transfer printer.

The middle tone layer 105 is provided between the decorating layer 103 and the light shielding layer 106. The middle tone layer 105 functions to prevent a contour of the light transmitting section 106A of the light shielding layer 106 that is lower than the middle tone layer 105 from being noticeable when a light image 12 is not displayed. For example, the middle tone layer 105 is formed by uniformly applying a certain middle tone color ink through printing on a back side of the light diffusion layer 104 by thermal transfer printing using a thermal transfer printer. In the present embodiment, an ink having a gray-based color or a metallic ink is used as a preferred example of the middle tone ink discovered by the inventors of the present invention. In particular, in the present embodiment, a non-electrically conductive gray-based color ink or a metallic ink (e.g., a In metallic ink, a Sn metallic ink, or the like) is used as the middle tone ink to prevent a contact sensing function of the electrostatic sensor 120 from being adversely affected. However, an ink used for the middle tone layer 105 is not limited thereto. Any color of ink may be used as long as at least it is possible to make the contour of the light transmitting section 106A of the light shielding layer 106 inconspicuous.

The light shielding layer 106 is provided on a back side of the decorating layer 103. The light shielding layer 106 partially transmits light emitted from the LED 130 to display a light image 12 of the predetermined shape on the front side of the electrostatic input device 10. Therefore, the light shielding layer 106 is formed with a light transmitting section 106A having an opening shape similar to that of the light image 12. For example, the light shielding layer 106 is formed by applying a light shielding ink (e.g., a black ink) through printing in a superposing manner on a portion other than the light transmitting section 106A on a lower side of the middle tone layer 105 by thermal transfer printing. In particular, in the present embodiment, the light shielding layer 106 is famed using a light shielding and non-conductive ink in order to prevent the contact sensing function of the electrostatic sensor 120 from being adversely affected.

The adhesive layer 107 is a layer formed at the back-side direction end (the bottom in the figure) of the decorating sheet 100 so that the decorating sheet 100 can be attached to a front side of a decoration-target component. In the present embodiment, the adhesive layer 107 is formed on a lower side of the light shielding layer 106. For example, the adhesive layer 107 is formed using an adhesive such as an optical clear adhesive (OCA).

The decorating sheet 100 described above is attached to a front side of a decoration-target component 110 by, for example, TOM molding. TOM molding is a molding method in which the decorating sheet 100 is placed in a box of a vacuum state in a manner to partitioning the box into an upper space and a lower space, the decorating sheet 100 is heated to be softened, the decoration-target component 110 is pressed against an adhesive surface of the decorating sheet 100 from the lower space, and then, an upper side of the decorating sheet 100 is pressed from the upper space by the atmosphere or compressed air to shape the decorating sheet 100 in accordance with the front-side surface of the decoration-target component 110, while the decorating sheet 100 is attached to the front side of the decoration-target component 110.

(Configuration of Tactile Layer 101)

Figure 3:
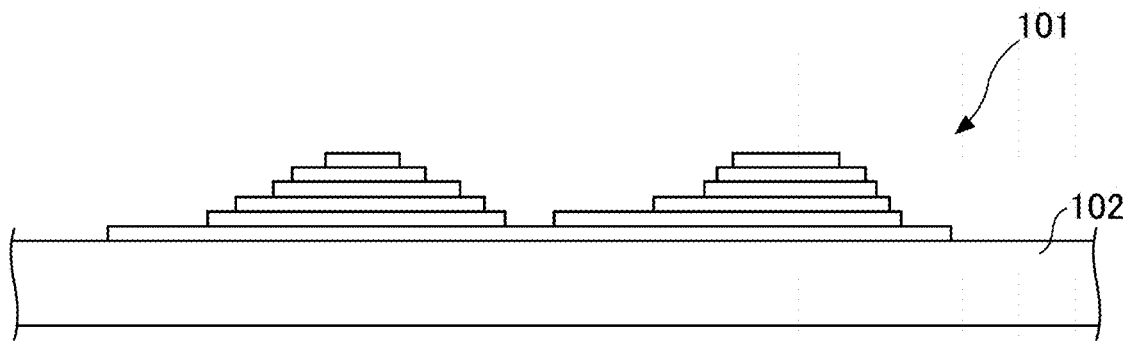
FIG. 3 is a partially magnified view of a tactile layer provided in a decorating sheet according to the first embodiment.

FIG. 3 is a partially magnified view of the tactile layer 101 provided in the decorating sheet 100 according to the first embodiment. As depicted in FIG. 3, the tactile layer 101 is formed in an uneven shape corresponding to the decorating pattern (e.g., a woodgrain pattern) that is formed in the decorating layer 103 by applying a plurality of layers of transparent ink on the front side (the upper side in the figure) of the base film layer 102 through thermal transfer printing.

This allows the tactile layer 101 to provide an operator with a tactile sensation more similar to a material (e.g., wood, or the like) that is simulated by the decorating pattern. Because the tactile layer 101 is formed in a three dimensional manner, it is possible to achieve a material feeling that is more similar to an actual material also visually.

In the present embodiment, the tactile layer 101 is famed by using a transparent color ink. Accordingly, the tactile layer 101 can suppress a decrease in visibility of the decorating pattern formed in the decorating layer 103 provided in a back-side direction with respect to the tactile layer 101.

However, the tactile layer 101 may be formed of, for example, a matte ink, a silver ink, a color ink, or the like, as well as a transparent color ink. This allows the tactile layer 101 to achieve a more authentic material feeling also visually.

The tactile layer 101 may use an ink of any color on a per ink layer basis. That is, the tactile layer 101 can have different ink colors with respect to a plurality of ink layers.

Each ink layer may be formed by a thermal transfer printer in which an ink ribbon coated on a film is heated at a desired position so that the ink at the heated position is transferred to the base film layer 102. The thickness of each ink layer depends on the type of ink used for that ink layer (e.g., on the order of a range between 0.5 and 5 μm).

As described above, the decorating sheet 100 according to the first embodiment includes the base film layer 102 made of the sheet-like base film, the decorating layer 103 containing the decorating pattern, the light shielding layer 106 provided on the back side of the decorating layer 103 and having the light transmitting section 106A of the predetermined shape, and the middle tone layer 105 formed between the decorating layer 103 and the light shielding layer 106.

Thus, the decorating sheet 100 according to the first embodiment is provided with the middle tone layer 105, so that, when a light image 12 is not displayed (that is, when the LED 130 does not emit light), it is possible to obscure the visibility of the contour of the light transmitting section 106A provided in the shielding layer 106 from the front side of the decorating sheet 100.

In addition, in the decorating sheet 100 according to the first embodiment, the middle tone layer 105 is formed by using an ink having a gray-based color or a metallic ink.

As a result, in the decorating sheet 100 according to the first embodiment, when a light image 12 is not displayed, it is possible to further obscure the visibility of the contour of the light transmitting section 106A provided by the light shielding layer 106 from the front side of the decorating sheet 100.

The decorating sheet 100 according to the first embodiment further includes the tactile layer 101, famed at the front-side direction end of the decorating sheet 100, having the uneven shape by applying a plurality of layers of ink through printing.

As a result, the decorating sheet 100 according to the first embodiment can provide a tactile sensation, similar to a material (e.g., a wood, a metal, or the like) simulated by the decorating pattern of the decorating layer 103, to an operating body (e.g., a human hand, a finger, or the like) contacting the front-side surface of the decorating sheet 100.

In addition, in the decorating sheet 100 according to the first embodiment, the tactile layer 101 is formed by using a transparent color ink.

As a result, the decorating sheet 100 according to the first embodiment can suppress a decrease in visibility of the decorating pattern of the decorating layer 103 that may otherwise occur when the tactile layer 101 is provided.

In addition, in the decorating sheet 100 according to the first embodiment, the decorating layer 103 (and the light diffusion layer 104, the middle tone layer 105, and the light shielding layer 106) is formed on the back side of the base film layer 102, and the tactile layer 101 is formed on the front side of the base film layer 102.

Thus, the base film layer 102 of the decorating sheet 100 according to the first embodiment protects the decorating layer 103 (and the light diffusion layer 104, the middle tone layer 105, and the light shielding layer 106), thereby increasing durability of the decorating layer 103 (and the light diffusion layer 104, the middle tone layer 105, and the light shielding layer 106).

In addition, in the decorating sheet 100 according to the first embodiment, each of the decorating layer 103, the middle tone layer 105, and the light shielding layer 106 is formed using a non-electrically conductive ink.

Thus, in the decorating sheet 100 according to the first embodiment, it is possible to prevent each of the decorating layer 103, the middle tone layer 105, and the light shielding layer 106 from adversely affecting the contact sensing function of the electrostatic sensor 120 when the configuration of placing the electrostatic sensor 120 in the back-side direction with respect to the decorating sheet 100 is employed.

Second Embodiment (Configuration of Decorating Sheet 100A)

FIG. 4 is a diagram schematically depicting a configuration of an electrostatic input device 10A according to a second embodiment. Hereinafter, changes from the electrostatic input device 10 according to the first embodiment will be described for the electrostatic input device 10A according to the second embodiment.

The electrostatic input device 10A according to the second embodiment is different from the electrostatic input device 10 according to the first embodiment in that a decorating sheet 100A is provided instead of the decorating sheet 100.

As depicted in FIG. 4, the decorating sheet 100A includes, from a front side (an upper side in the figure), the tactile layer 101, the base film layer 102, the decorating layer 103, the light diffusion layer 104, a reflection suppressing layer 108, the light shielding layer 106, and the adhesive layer 107. That is, the decorating sheet 100A differs from the decorating sheet 100 according to the first embodiment in that the decorating sheet 100A has the reflection suppressing layer 108 instead of the middle tone layer 105.

The reflection suppressing layer 108 is provided between the decorating layer 103 and the light shielding layer 106. When a light image 12 is displayed, the reflection suppressing layer 108 suppresses reflection of a decorating pattern, formed at a position overlapping the light image 12, onto the light image 12. For this purpose, the reflection suppressing layer 108 is formed as a result of an inverse image (an example of a "reflection suppressing image") with respect to the decorating pattern of the decorating layer 103 being formed through thermal transfer printing using a thermal transfer printer on a back side of the light diffusion layer 104. An inverse image is an image in which shading is inverted on a per pixel basis with respect to an original image. In the present embodiment, a black-and-white image or a color image using complementary colors with respect to the decorating pattern may be used as a preferred example of the inverse image of the decorating pattern, found by the inventors of the present invention.

(One Example of Decorating Layer 103 and Reflection Suppressing Layer 108)

Figure 5A:
FIGS. 5A and 5B depict examples of a decorating layer and a reflection suppressing layer famed in a decorating sheet according to the second embodiment.
Figure 5B:
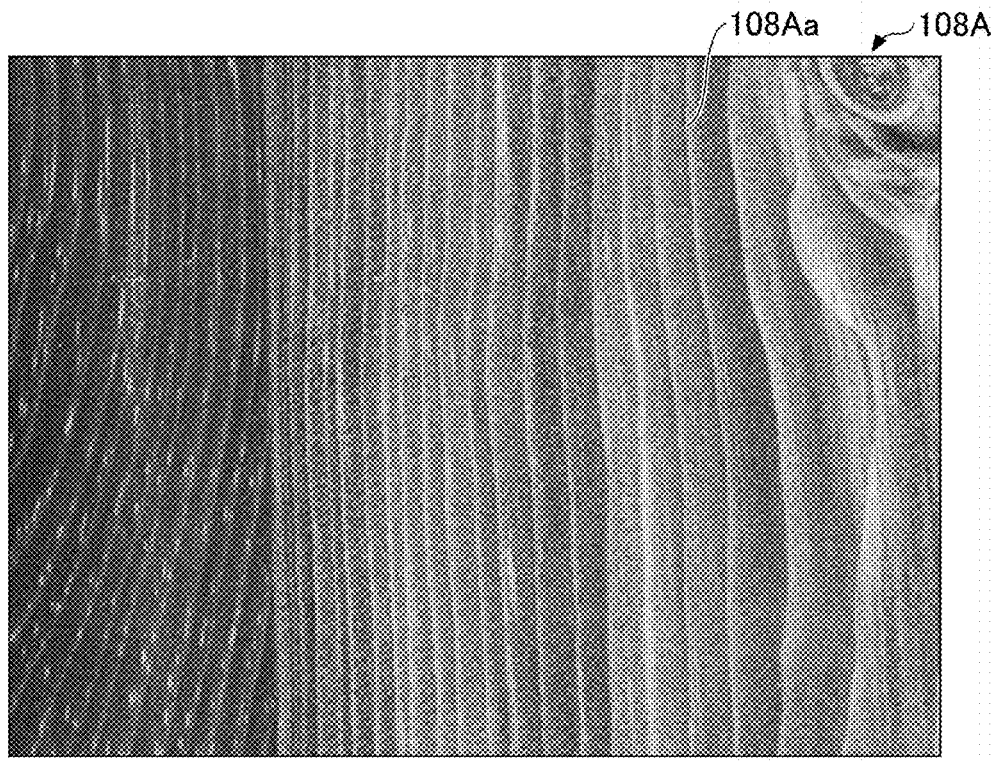

FIGS. 5A and 5B are diagrams depicting an example of the decorating layer 103 and the reflection suppressing layer 108 formed in the decorating sheet 100A according to the second embodiment. FIG. 5A depicts an example of the decorating pattern 103A formed at the decorating layer 103 in the decorating sheet 100A according to the second embodiment. FIG. 5B depicts an example of the inverse image 108A formed at the reflection suppressing layer 108 in the decorating sheet 100A according to the second embodiment.

As depicted in FIG. 5A, the decorating pattern 103A of the decorating layer 103 has a woodgrain pattern. As depicted in FIG. 5B, the inverse image 108A of the reflection suppressing layer 108 has a woodgrain pattern similar to that of the decorating pattern 103A, but colors that are inverted from those of the decorating pattern 103A are used. Therefore, for example, woodgrain 103Aa expressed by dark colors in the decorating pattern 103A depicted in FIG. 5A is expressed as woodgrain 108Aa expressed by light colors in the inverse image 108A depicted in FIG. 5B.

As a result, the decorating sheet 100A according to the second embodiment can obscure the visibility of woodgrain 103Aa (of dark color) of the decorating pattern 103A famed at a position overlapping the light image 12 from the front side of the decorating sheet 100A when a light image 12 is displayed, because of woodgrain 108Aa (of light colors) of the inverse image 108A formed at the same position.

What is needed as the inverse image 108A is that the inverse image 108A is at least capable of suppressing reflection of the woodgrain pattern 103Aa onto the light image 12. For example, the inverse image 108A may be an image obtained from only woodgrain 108Aa being printed.

Comparative Example

Figure 6A:
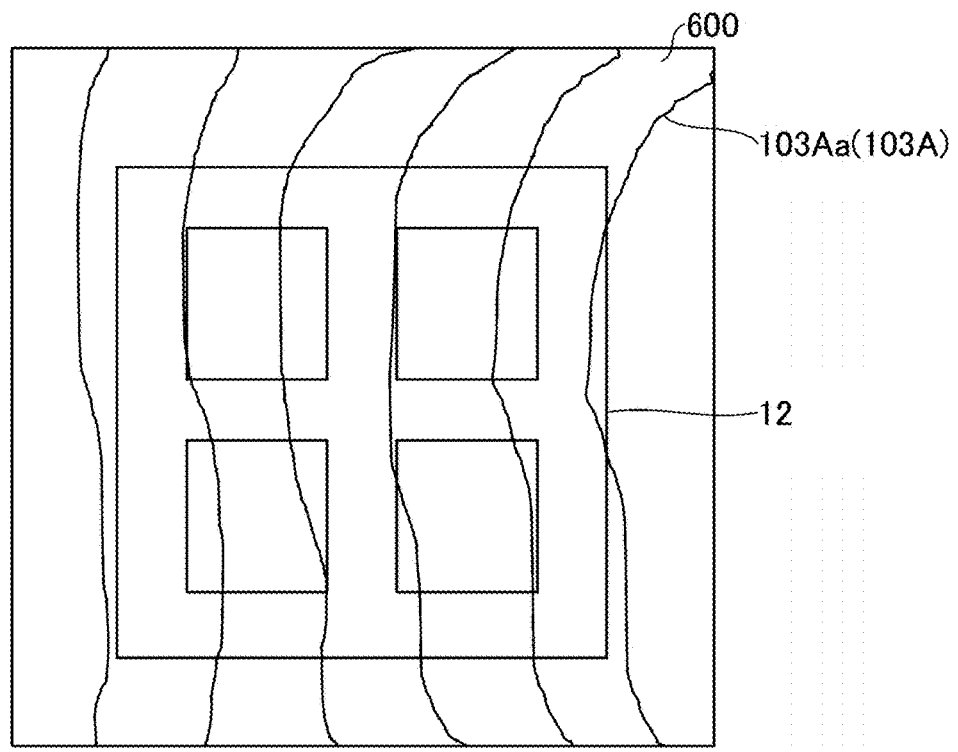
FIG. 6A depicts a comparative example with respect to the decorating sheet according to the second embodiment.

FIG. 6A is a diagram depicting a comparison example with respect to the decorating sheet 100A according to the second embodiment. The comparative example is a decorating sheet 600 in the related art obtained from removing the reflection suppressing layer 108 from the decorating sheet 100A of the second embodiment.

Figure 6B:
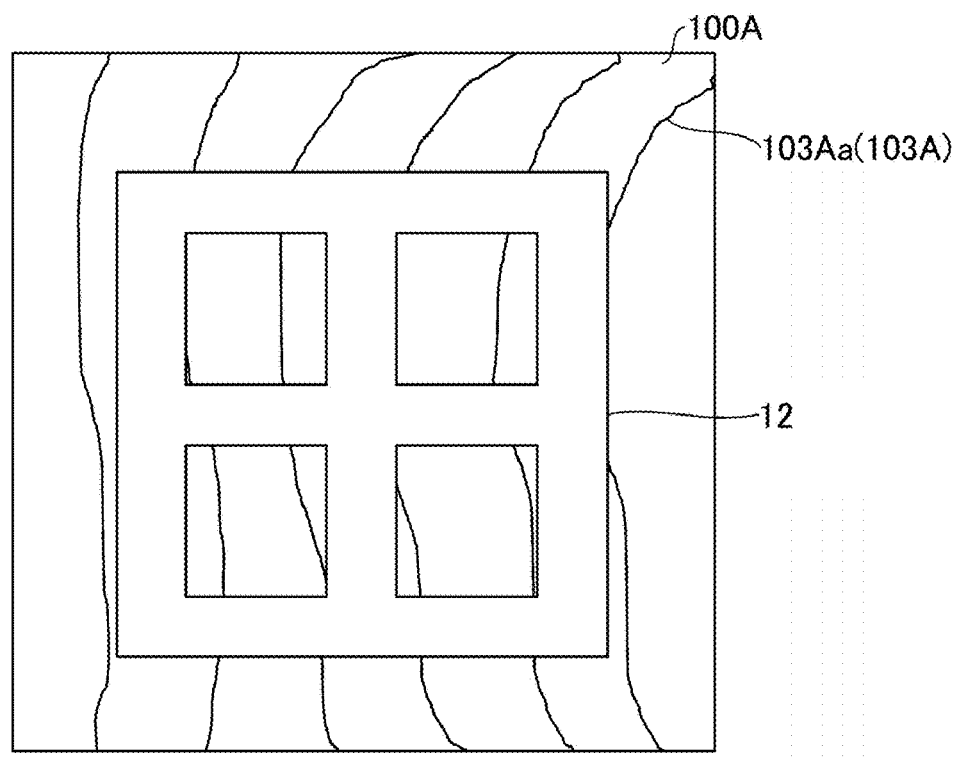
FIG. 6B depicts the decorating sheet according to the second embodiment.

FIG. 6A depicts a partially magnified view of the decorating sheet 600 in the related art (a portion where a light image 12 is luminous) in a state where the light image 12 is present as a luminous image. FIG. 6B depicts a partially magnified view of the decorating sheet 100A (a portion where a light image 12 is luminous) according to the second embodiment in a state where the light image 12 is present as a luminous image.

As depicted in FIG. 6A, in the decorating sheet 600 in the related art, when the light image 12 is present as a luminous image, the woodgrain 103Aa of the decorating pattern 103A famed at a position overlapping the light image 12 remains visible. In contrast, as depicted in FIG. 6B, in the decorating sheet 100A according to the second embodiment, when the light image 12 is present as a luminous image, the visibility of the woodgrain pattern 103Aa of the decorating pattern 103A formed at a position overlapping the light image 12 is obscured because the reflection suppressing layer 108 is provided.

Thus, the decorating sheet 100A according to the second embodiment includes the base film layer 102 including the sheet-like base film, the decorating layer 103 containing the decorating pattern, the light shielding layer 106 provided on the back side of the decorating layer 103 and including the light transmitting section 106A that has the predetermined shape, and the reflection suppressing layer 108 having the inverse image with respect to the decorating pattern and being formed between the decorating layer 103 and the light shielding layer 106.

As a result, because the decorating sheet 100A according to the second embodiment is provided with the reflection suppressing layer 108, it is possible to obscure the visibility of a portion of the decorating pattern of the decorating layer 103 formed at a position overlapping a light image 12 from the front side of the decorating sheet 100A when the light image 12 is displayed (that is, when the LED 130 emits light).

Further, in the decorating sheet 100A according to the second embodiment, the reflection suppressing layer 108 uses, as the inverse image, a black-and-white image or a color image using complementary colors with respect to the decorating pattern.

Thus, when the light image 12 is displayed, the decorating sheet 100A according to the second embodiment can further obscure the visibility of a portion of the decorating pattern of the decorating layer 103 formed at a position overlapping the light image 12 from the front side of the decorating sheet 100A.

In the decorating sheet 100A according to the second embodiment, the decorating sheet 100A further includes the tactile layer 101, having an uneven shape formed by applying a plurality of ink layers through printing, at the front-side direction end of the decorating sheet 100A.

Accordingly, the decorating sheet 100A according to the second embodiment can provide a tactile sensation, more similar to that of a material (e.g., a wood, a metal, or the like) simulated by the decorating pattern of the decorating layer 103, to an operating body (e.g., a human hand, a human finger, or the like) that contacts the front-side surface of the decorating sheet 100A.

In addition, in the decorating sheet 100A according to the second embodiment, the tactile layer 101 is famed by using a transparent color ink.

Accordingly, the decorating sheet 100A according to the second embodiment can suppress a decrease in visibility of the decorating pattern of the decorating layer 103 that may otherwise occur when the tactile layer 101 is provided.

In addition, in the decorating sheet 100A according to the second embodiment, the decorating pattern is a woodgrain pattern.

Accordingly, in the decorating sheet 100A according to the second embodiment, when a light image 12 is displayed, it is possible to obscure the visibility of a portion of the woodgrain pattern formed at a position overlapping the light image 12 from the front side of the decorating sheet 100A.

Although decorating sheets and the electrostatic input devices have been described with reference to the embodiments, the present invention is not limited to these embodiments, and various modifications or variations can be made within the scope of the present invention.

For example, a decorating sheet of the present invention may be used for decorating an interior or exterior component of a vehicle, for example, but is not limited thereto, and a decorating sheet of the present invention may be used for any decoration-target component. In addition, a decorating sheet of the present invention is also applicable not only to a decoration-target component provided with an electrostatic sensor but also to a decoration-target component not provided with an electrostatic sensor.

A decorating sheet of the present invention may include both the middle tone layer described with respect to the first embodiment and the reflection suppressing layer described with respect to the second embodiment. In this case, the decorating sheet can have the advantageous effects of both obscuring the visibility of the contour of the light transmitting section of the light shielding layer, and obscuring the visibility of a portion of the decorating pattern present formed at a position overlapping the light image.

The decorating sheet of the invention may include a further layer (e.g., a color filter layer that is configured to totally or partially color a light image 12, or the like) in addition to the configuration described with respect to each embodiment.

What is claimed is:

1. A decorating sheet to be attached to a surface of a decoration-target component, the decorating sheet comprising:
    a base film layer including a sheet-like base film;
    a decorating layer containing a decorating pattern;
    a light shielding layer provided in a back-side direction with respect to the decorating layer, the light shielding layer including a light transmitting section that has a predetermined shape; and
    a reflection suppressing layer provided between the decorating layer and the light shielding layer, the reflection suppressing layer containing a reflection suppressing image that is configured to suppress reflection of the decorating pattern onto a light image that is formed by light transmitted through the light transmitting section,
    wherein
    the reflection suppressing image is an inverse image with respect to the decorating pattern.

2. The decorating sheet as claimed in claim 1, wherein
    a black-and-white image is used as the inverse image of the reflection suppressing layer.

3. The decorating sheet as claimed in claim 1, wherein
    an image using a complementary color with respect to a color of the decorating pattern is used as the inverse image of the reflection suppressing layer.

4. The decorating sheet according to claim 1, further comprising
    a tactile layer provided at a front-side direction end of the decorating sheet, the tactile layer including a plurality of layers of ink applied on top of each other through printing to form an uneven shape.

5. The decorating sheet as claimed in claim 4, wherein
    the tactile layer is formed of a transparent color ink.

6. The decorating sheet as claimed in claim 1, wherein
    the decorating pattern is a woodgrain pattern.

7. An electrostatic input device comprising:
    the decorating sheet claimed in claim 1; and
    an electrostatic sensor provided in a back-side direction with respect to the decorating sheet.

8. The electrostatic input device as claimed in claim 7, further comprising
    a light source provided in the back-side direction with respect to the decorating sheet to emit light to the decorating sheet.

* * * * *